(12) United States Patent     (10) Patent No.:     US 6,659,371 B2
Carney                        (45) Date of Patent:     Dec. 9, 2003

(54) FUEL INJECTOR SEAL CONSTRUCTION AND METHOD OF MANUFACTURE

(75) Inventor: Thomas James Carney, West Chicago, IL (US)

(73) Assignee: Senior Investments AG, Schaffhausen (CH)

( * ) Notice: Subject to any disclaimer, the term of this patent is extended or adjusted under 35 U.S.C. 154(b) by 200 days.

(21) Appl. No.: 10/015,048

(22) Filed: Oct. 26, 2001

(65) Prior Publication Data

US 2003/0080218 A1 May 1, 2003

(51) Int. Cl.[7] ................................................ F02M 61/10
(52) U.S. Cl. ................. 239/533.11; 239/88; 239/533.3; 239/533.9; 239/585.1; D23/384; 277/636
(58) Field of Search ............................. 239/88, 92, 93, 239/95, 533.1, 533.3, 533.9, 533.11, 585.1, 102.2; D23/384; 277/636; 285/235; 403/50

(56) References Cited

U.S. PATENT DOCUMENTS

| | | | |
|---|---|---|---|
| 4,528,959 A | * 7/1985 | Hauser, Jr. | 277/591 |
| 4,558,664 A | * 12/1985 | Robben | 123/23 |
| 4,570,600 A | 2/1986 | Atkins et al. | 123/468 |
| 4,627,826 A | * 12/1986 | Juziuk et al. | 277/636 |
| 4,971,014 A | 11/1990 | Usui | 123/470 |
| 5,002,030 A | 3/1991 | Mahnke | 123/469 |
| 5,285,830 A | * 2/1994 | Hilpipre, Jr. | 277/602 |
| 5,390,638 A | 2/1995 | Hornby et al. | 123/456 |
| 5,735,247 A | 4/1998 | Tsuzuki et al. | 123/470 |
| 6,311,950 B1 | * 11/2001 | Kappel et al. | 251/129.06 |
| 6,530,273 B1 | * 3/2003 | Gottlieb et al. | 239/88 |

* cited by examiner

Primary Examiner—Robin O. Evans
(74) Attorney, Agent, or Firm—Greenberg Traurig, P.C.

(57) ABSTRACT

A fuel injector seal for preventing the intrusion of liquid fuel into the working moving parts of a fuel injector. The seal is in the form of a flexible bellows, assembled from first, inner and second, outer caps joined together. The seal is positioned in the injector to create a liquid tight seal between the reciprocating injector jet needle and the enclosure for the remaining fuel-sensitive components of the injector.

18 Claims, 3 Drawing Sheets

FUEL INJECTOR SEAL CONSTRUCTION AND METHOD OF MANUFACTURE

BACKGROUND OF THE INVENTION

1. The Technical Field

The present invention relates to fuel injectors for internal combustion engines.

2. The Prior Art

In its simplest conception, a fuel injector for an internal combustion engine is a high frequency, short stroke valve that permits fuel to be incrementally introduced, under substantial pressure, into an engine cylinder. Typically, an injector includes the following functional components: a body; an jet needle and tappet rod, configured for reciprocating movement within the body; some sort of biasing device (e.g., a coil spring) for biasing the jet needle and tappet rod toward the closed (or open) position with respect to the fuel inlet aperture into the cylinder; and some sort of motive mechanism (e.g., a magnetic solenoid-like arrangement) for transiently and intermittently moving the jet needle from the closed (or open) position to an open (or closed) position. The far end of the jet needle, in the closed position, rests in a seat formed on the outside of the cylinder head. The fuel flows through the body of the injector, typically from an inlet in the body (usually remote from the seat), around the jet needle and tappet rod, and out through the aperture into the cylinder (when the jet needle is moved away from the seat).

In typical prior art injectors, the fuel comes into direct contact with the tappet rod, the biasing device, and even possibly components of the motive mechanism. Due to the corrosive nature of most fuels, this may have the result of causing premature degradation of one or more of the internal moving components of the injector.

Accordingly, it would be desirable to provide a structure for isolating sensitive moving parts within a fuel injector, from exposure to potentially corrosive fuel, without adversely affecting the performance of the injector and/or significantly increasing the cost of the injector.

These and other desirable characteristics of the invention will become apparent in light of the present specification and drawings.

SUMMARY OF THE INVENTION

The invention comprises, in part, a seal for a fuel injector for an internal combustion engine, wherein the fuel injector includes an injector body surrounding a reciprocating injector jet needle, supported by a tappet rod, an end of the tappet rod extending into an enclosure within the injector body, surrounding one or more structures for enabling the supported reciprocating movement of the injector jet needle, for providing a liquid-tight seal between the tappet rod and the enclosure, for precluding the intrusion of liquid fuel into the enclosure.

The seal for a fuel injector for an internal combustion engine comprises a flexible bellows member, including a first cap sealingly joined to a second cap. The first cap includes a first collar for connection to one of a tappet rod of a fuel injector and regions proximate an aperture into an enclosure through which a tappet rod of a fuel injector passes, the first cap further including a substantially radially extending flare and a second collar. The second cap includes a first collar for connection to the other one of regions proximate an aperture into an enclosure through which a tappet rod of a fuel injector passes and a tappet rod of a fuel injector, the second cap further including a substantially radially extending flare and a second collar. The second collar of the first cap is sealingly joined to the second collar of the second cap, whereupon installation of the seal into a fuel injector, the seal precludes intrusion of liquid fuel at the aperture of the enclosure.

The seal preferably has a longitudinal axis. The second collar of the first cap is a substantially cylindrical member concentric to the longitudinal axis; the second collar of the second cap is a substantially cylindrical member concentric to the longitudinal axis; and the second collar of the first cap is insertingly received within the second collar of the second cap.

The second collar of the first cap is sealing affixed to the second collar of the second cap preferably by a braze or weld.

The first and second caps are preferably formed by stamping.

The first and second caps are preferably fabricated from a liquid fuel resistant material. The first and second caps are preferably fabricated from stainless steel.

The invention also comprises, in part, a fuel injector for an internal combustion engine, comprising an injector body; a reciprocating injector jet needle in the injector body, supported by a tappet rod, an end of the tappet rod extending into an enclosure within the injector body, the enclosure surrounding one or more structures for enabling the supported reciprocating movement of the injector jet needle; and a fuel injector seal for providing a liquid-tight seal between the tappet rod and the enclosure, for precluding the intrusion of liquid fuel into the enclosure.

The seal further comprises a flexible bellows member, including an first cap sealingly joined to an second cap. The first cap includes a first collar connected to one of the tappet rod of the fuel injector and the aperture into the enclosure through which the tappet rod of the fuel injector passes, the first cap further including a substantially radially extending flare and a second collar. The second cap includes a first collar connected to the other of the aperture into the enclosure through which the tappet rod of the fuel injector passes and the tappet rod of the fuel injector, the second cap further including a substantially radially extending flare and a second collar. The second collar of the first cap is sealingly joined to the second collar of the second cap. The seal precludes intrusion of liquid fuel at the aperture of the enclosure.

Preferably, the seal has a longitudinal axis; the second collar of the first cap is a substantially cylindrical member concentric to the longitudinal axis; the second collar of the second cap is a substantially cylindrical member concentric to the longitudinal axis; and the second collar of the first cap is insertingly received within the second collar of the second cap.

The second collar of the first cap is sealing affixed to the second collar of the second cap by a braze or weld.

Preferably, the first and second caps are formed by stamping.

Preferably, the first and second caps are fabricated from a liquid fuel resistant material, preferably stainless steel.

The present invention also comprises, in part, a method for manufacturing a seal for a fuel injector for an internal combustion engine, wherein the fuel injector includes an injector body surrounding a reciprocating injector jet needle, supported by a tappet rod, an end of the tappet rod extending into an enclosure within the injector body, surrounding one or more structures for enabling the supported reciprocating movement of the injector jet needle, for providing a liquid-tight seal between the tappet rod and the enclosure, for precluding the intrusion of liquid fuel into the enclosure, the method for manufacturing a seal for a fuel injector for an internal combustion engine comprising:

forming a flexible bellows member, including a first cap sealingly joined to a second cap;

forming the first cap to include a first collar for connection to one of a tappet rod of a fuel injector and regions proximate an aperture into an enclosure through which a tappet rod of a fuel injector passes, the first cap further including a substantially radially extending flare and a second collar;

forming the second cap to include a first collar for connection to the other of regions proximate an aperture into an enclosure through which a tappet rod of a fuel injector passes and a tappet rod of a fuel injector, the second cap further including a substantially radially extending flare and a second collar;

sealingly joining the second collar of the first cap to the second collar of the second cap;

whereupon installation of the seal into a fuel injector, the seal precludes intrusion of liquid fuel at the aperture of the enclosure.

The method further comprises the steps of forming the seal with a longitudinal axis;

forming the second collar of the first cap as a substantially cylindrical member concentric to the longitudinal axis;

forming the second collar of the second cap as a substantially cylindrical member concentric to the longitudinal axis;

inserting the second collar of the first cap within the second collar of the second cap.

The method preferably further comprises the step of:

sealingly affixing the second collar of the first cap to the second collar of the second cap by a braze or weld.

The method preferably further comprises the step of forming the first and second caps by stamping.

The method may further comprise the step of fabricating the first and second caps from a liquid fuel resistant material, preferably stainless steel.

BEST MODE FOR CARRYING OUT THE INVENTION

Figure 1:
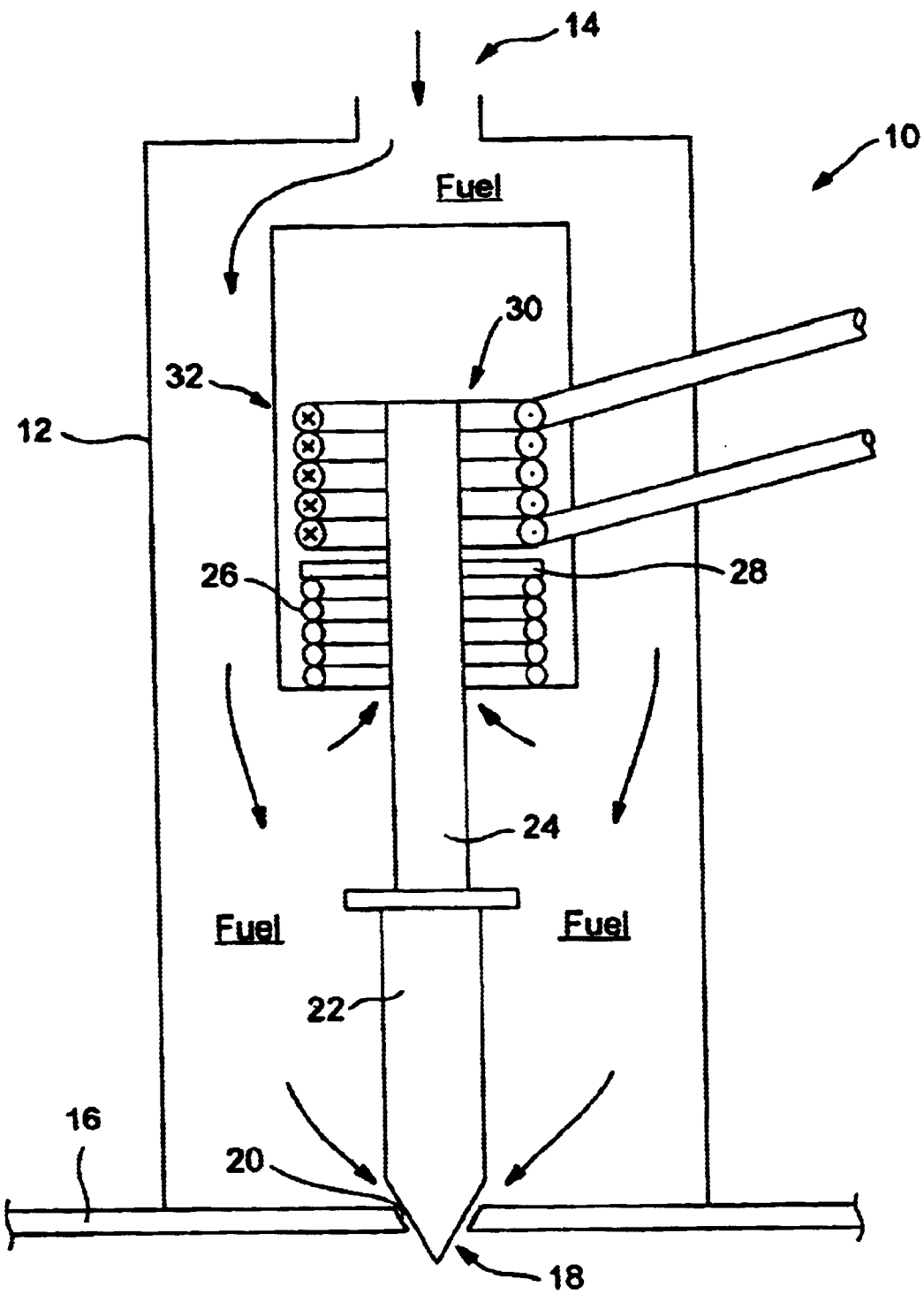
FIG. 1 is a substantially schematic illustration of a prior art fuel injector.

While this invention is susceptible of embodiment in many different forms, there are shown in the drawings and will be described in detail herein several specific embodiments, with the understanding that the present disclosure is to be considered an exemplification of the principles of the invention and is not intended to limit the invention to the embodiments illustrated.

FIG. 1 is a substantially schematic illustration of a prior art fuel injector. It is to be understood that FIG. 1 is intended to be a functional representation of a fuel injector, and that the specific size, shape, and structure of the components varies from manufacturer to manufacturer, and from application to application. Injector 10 includes injector body 12, having a fuel inlet 14. Injector 10 is held in contact with cylinder head 16, having fuel inlet aperture 18, defining seat 20. Jet needle 22, supported by tappet rod 24, is mounted for reciprocating movement within body 12. The double-headed arrow indicates movement direction. A biasing element 26 (shown as a coil spring) is connected to tappet rod 24 in such a way as to bias the end of jet needle 22 either into or out of seat 20, as may be desired (e.g., biasing element 26 may be either in tension, pulling downwardly on flange 28 attached to tappet rod 24, or in compression, pushing upwardly on flange 28).

A motive mechanism 30 (shown schematically as a magnetic solenoid arrangement) when energized in a controlled manner, using known principles, provides force acting on tappet rod, to counteract the biasing force of biasing element 26.

Biasing element 26 and motive mechanism 30 will typically be surrounded by an enclosure 32. To the extent that the motive mechanism 30 requires a source of power, outside of enclosure 32, any electrical wires, or hydraulic connections, etc, that pass through the wall of enclosure 32, being non-moving components, may be and typically are sealed, to prevent intrusion of liquid at the location where the components pass through the wall of enclosure 32. However, typically enclosure 32 has not been, in prior art fuel injectors, configured to prevent fuel from insinuating itself into the workings of the biasing element and the motive mechanism, through the aperture through which tappet rod 24 passes. Inasmuch as most fuels for internal combustion engines are typically corrosive, particularly with respect to the materials, which typically are employed in such biasing elements and motive mechanisms, premature degradation of such components may occur. Therefore, it is desirable to provide a structure for sealing off the interior workings of a fuel injector from the fuel.

Figure 2:
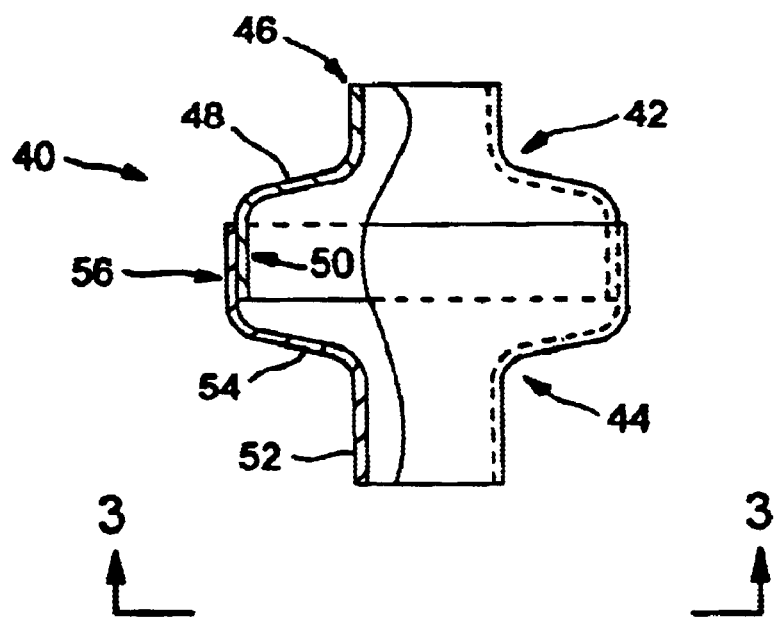
FIG. 2 is a side elevation, partially in section, of a fuel injector seal according to a preferred embodiment of the invention.
Figure 3:
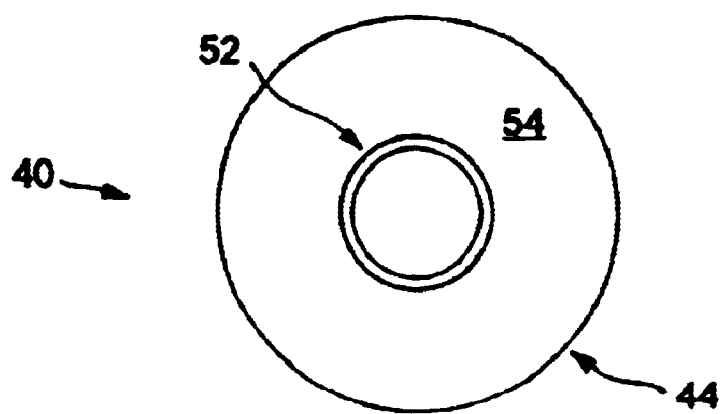
FIG. 3 is an end elevation of the fuel injector seal of FIG. 2.

FIGS. 2 and 3 illustrate a fuel injector seal, according to one embodiment of the invention. As described and illustrated in further detail below, seal 40 will be connected at one end to tappet rod 24, and at the other end to the Seal 40 is essentially, a single corrugation flexible bellows, formed from a first, inner cap 42 and a second, outer cap 44. Inner cap 42 has first, narrow collar 46, flare 48 and second, wide collar 50. Outer cap 44 has first, narrow collar 52, flare 54 and second, wide collar 56. The overall dimensions of seal 40 will typically be quite short (overall axial length on the order of 10 millimeters; overall greatest diameter on the order of 9 millimeters; and the diameters of the narrow collars on the order of 3 millimeters. The material thickness must be quite thin in order to permit the single corrugation to be flexible. Accordingly, the material thickness will be on the order of 0.4–0.5 mm. Inner cap 42 and outer cap 44 will preferably be fabricated from the same material, preferably a corrosion resistant material, such as a stainless steel, such as 304L stainless steel. Inner cap 42 is inserted into outer cap 44, and affixed to one another by any suitable means, such as, for example, a copper braze.

Figure 4:
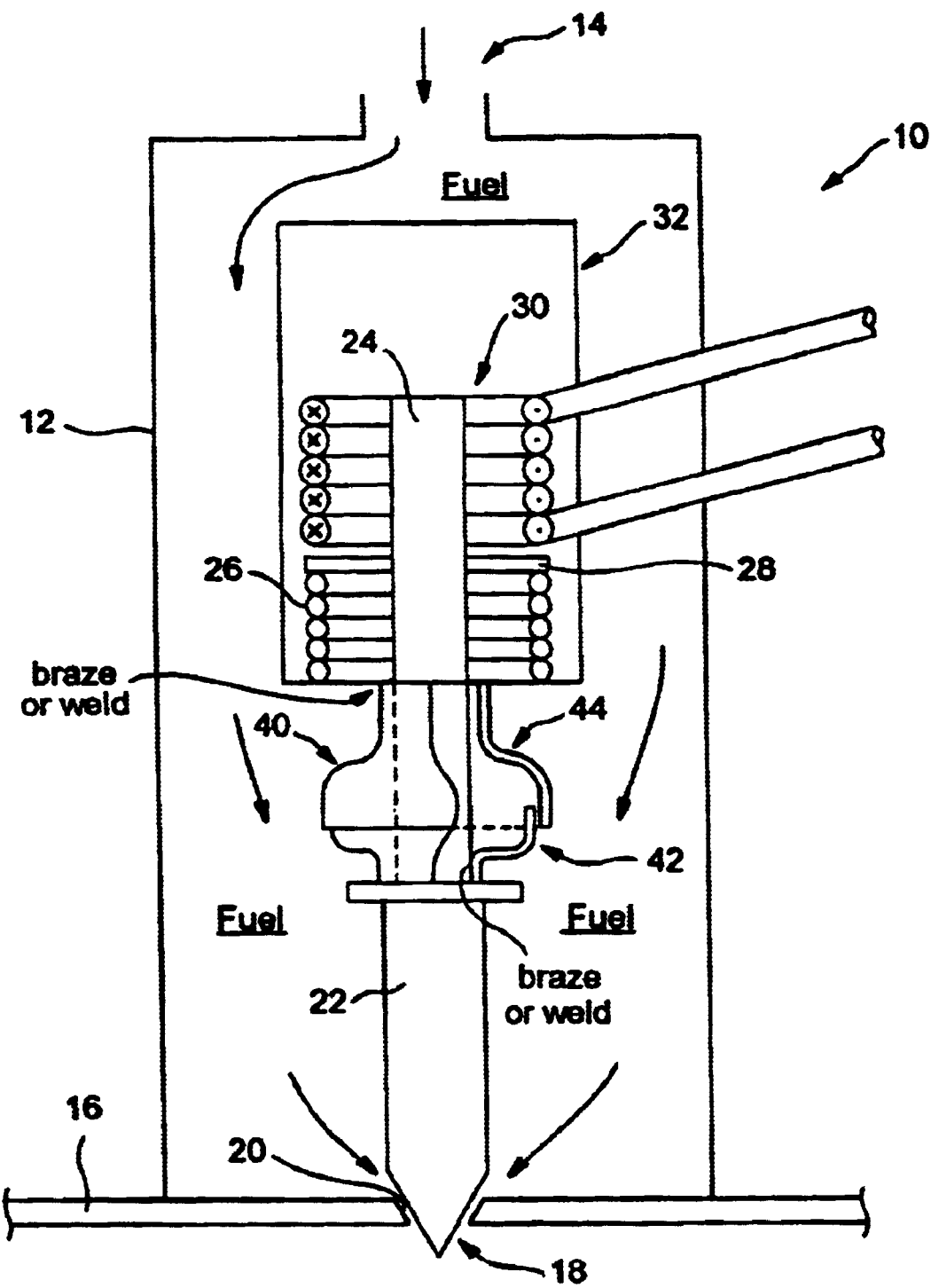
FIG. 4 is a schematic illustration of a fuel injector incorporating a fuel injector seal according to a preferred embodiment of the invention.

FIG. 4 illustrates a fuel injector seal 40 in position in a fuel injector 10. Tappet rod 24 passes through seal 40. In a preferred embodiment of the invention, narrow collar 52 of outer cap 44 is affixed to enclosure 32, around the aperture through which tappet rod 24 passes, by any suitable method that results in a liquid-tight connection between outer cap 44 and enclosure 32. Narrow collar 46 of inner cap 42 is affixed, e.g., by copper braze, to the outer surface of tappet rod 24. Thus, a liquid tight seal between the moving tappet rod 24 and enclosure 32 prevents the intrusion of liquid fuel into the interior of enclosure 32, and, in turn, immersion of the biasing element 26 and motive mechanism 30 in corrosive fuel. It is believed that a fuel injector seal, fabricated and installed as described herein, will have a robust structure, capable of accommodating the short stroke of an injector (typically on the order of 0.07 mm) and the high pressures encountered (on the order of 23 MPA), for a relatively long and economical duty life.

Seal 40 is preferably fabricated, by forming inner cap 42 and outer cap 44 by stamping, and by joining the inner and outer caps by brazing, preferably copper brazing. It is believed that this method of assembly is advantageous, with respect to a method such as hydroforming, for several reasons. The relatively small scale, in itself, makes the tooling issues for hydroforming problematic. In addition, the preferred material (stainless steel) imposes workability limitations. For example, for a typical stainless steel hydroformed bellows, the outside diameter of the corrugation usually cannot exceed 1.45 times the inside diameter of the corrugation (the diameter of the "trough" of the corrugations). This is a function of the amount of elongation the material will tolerate during hydroforming, before failure. However, in stamping the bellows, as two halves, the ratio of the greatest and least diameters can be considerably greater. This is advantageous in that the higher the outside diameter/inside diameter ratio, the more axial motion a corrugation can experience repeatedly without failure.

Preferably, the caps will be fabricated from precipitation hardened stainless steel. Once the parts have been heat treated, the strength of the components may exceed twice that of typical stainless steels.

Instead of axially overlapping the wide collars of the inner and outer caps, the bellows could be formed by "edge welding" (i.e., the edges of the second, outer collars of the caps are the same diameter and are butted up against one another), although edge welding is a relatively more expensive process than brazing or other welding techniques and thus could make the overall component more expensive. The components which make up the seal of the present invention, using the overlapping collars and brazing technique, lend themselves to automated assembly, using known automation techniques, such that large numbers of seals may be assembled and welded or brazed in large numbers in a controlled atmosphere furnace.

A further advantage over an edge welded construction is that the longitudinally extending braze in the present invention is capable of withstanding substantial axial compressive and tensile forces. A comparably dimensioned edge welded construction may be somewhat weaker in tension, because the weld nugget would be exposed to bending moments.

The foregoing description and drawings merely explain and illustrate the invention and the invention is not limited thereto, as those skilled in the art who have the disclosure before them to make modifications and variations therein without departing from the scope of the invention.

What is claimed is:

1. A seal for a fuel injector for an internal combustion engine, wherein the fuel injector includes an injector body surrounding a reciprocating injector jet needle, supported by a tappet rod, an end of the tappet rod extending into an enclosure within the injector body, surrounding one or more structures for enabling the supported reciprocating movement of the injector jet needle, for providing a liquid-tight seal between the tappet rod and the enclosure, for precluding the intrusion of liquid fuel into the enclosure, the seal for a fuel injector for an internal combustion engine comprising:
    a flexible bellows member, including a first cap sealingly joined to a second cap;
    the first cap including a first collar for connection to one of a tappet rod of a fuel injector and regions proximate an aperture into an enclosure through which a tappet rod of a fuel injector passes, the first cap further including a substantially radially extending flare and a second collar;
    the second cap including a first collar for connection to the other one of regions proximate an aperture into an enclosure through which a tappet rod of a fuel injector passes and a tappet rod of a fuel injector, the second cap further including a substantially radially extending flare and a second collar;
    the second collar of the first cap being sealingly joined to the second collar of the second cap;
    whereupon installation of the seal into a fuel injector, the seal precludes intrusion of liquid fuel at the aperture of the enclosure.

2. The fuel injector seal according to claim 1, wherein the seal has a longitudinal axis; the second collar of the first cap is a substantially cylindrical member concentric to the longitudinal axis; the second collar of the second cap is a substantially cylindrical member concentric to the longitudinal axis; and the second collar of the first cap is insertingly received within the second collar of the second cap.

3. The fuel injector seal according to claim 2, wherein the second collar of the first cap is sealing affixed to the second collar of the second cap by a braze or weld.

4. The fuel injector seal according to claim 1, wherein the first and second caps are formed by stamping.

5. The fuel injector seal according to claim 1, wherein the first and second caps are fabricated from a liquid fuel resistant material.

6. The fuel injector seal according to claim 5, wherein the first and second caps are fabricated from stainless steel.

7. A fuel injector for an internal combustion engine, comprising:
    an injector body;
    a reciprocating injector jet needle in the injector body, supported by a tappet rod, an end of the tappet rod extending into an enclosure within the injector body, the enclosure surrounding one or more structures for enabling the supported reciprocating movement of the injector jet needle; and
    a fuel injector seal for providing a liquid-tight seal between the tappet rod and the enclosure, for precluding the intrusion of liquid fuel into the enclosure, the seal further comprising:
        a flexible bellows member, including an first cap sealingly joined to an second cap;
        the first cap including a first collar connected to one of the tappet rod of the fuel injector and the aperture into the enclosure through which the tappet rod of the fuel injector passes, the first cap further including a substantially radially extending flare and a second collar;
        the second cap including a first collar connected to the other of the aperture into the enclosure through which the tappet rod of the fuel injector passes and the tappet rod of the fuel injector, the second cap further including a substantially radially extending flare and a second collar;

the second collar of the first cap being sealingly joined to the second collar of the second cap;

the seal precluding intrusion of liquid fuel at the aperture of the enclosure.

8. The fuel injector seal according to claim 7, wherein the seal has a longitudinal axis; the second collar of the first cap is a substantially cylindrical member concentric to the longitudinal axis; the second collar of the second cap is a substantially cylindrical member concentric to the longitudinal axis; and the second collar of the first cap is insertingly received within the second collar of the second cap.

9. The fuel injector seal according to claim 8, wherein the second collar of the first cap is sealing affixed to the second collar of the second cap by a braze or weld.

10. The fuel injector seal according to claim 7, wherein the first and second caps are formed by stamping.

11. The fuel injector seal according to claim 7, wherein the first and second caps are fabricated from a liquid fuel resistant material.

12. The fuel injector seal according to claim 11, wherein the first and second caps are fabricated from stainless steel.

13. A method for manufacturing a seal for a fuel injector for an internal combustion engine, wherein the fuel injector includes an injector body surrounding a reciprocating injector jet needle, supported by a tappet rod, an end of the tappet rod extending into an enclosure within the injector body, surrounding one or more structures for enabling the supported reciprocating movement of the injector jet needle, for providing a liquid-tight seal between the tappet rod and the enclosure, for precluding the intrusion of liquid fuel into the enclosure, the method for manufacturing a seal for a fuel injector for an internal combustion engine comprising:

forming a flexible bellows member, including a first cap sealingly joined to a second cap;

forming the first cap to include a first collar for connection to one of a tappet rod of a fuel injector and regions proximate an aperture into an enclosure through which a tappet rod of a fuel injector passes, the first cap further including a substantially radially extending flare and a second collar;

forming the second cap to include a first collar for connection to the other of regions proximate an aperture into an enclosure through which a tappet rod of a fuel injector passes and a tappet rod of a fuel injector, the second cap further including a substantially radially extending flare and a second collar;

sealingly joining the second collar of the first cap to the second collar of the second cap;

whereupon installation of the seal into a fuel injector, the seal precludes intrusion of liquid fuel at the aperture of the enclosure.

14. The method according to claim 13, further comprising the steps of forming the seal with a longitudinal axis;

forming the second collar of the first cap as a substantially cylindrical member concentric to the longitudinal axis;

forming the second collar of the second cap as a substantially cylindrical member concentric to the longitudinal axis;

inserting the second collar of the first cap within the second collar of the second cap.

15. The method according to claim 14, further comprising the step of:

sealingly affixing the second collar of the first cap to the second collar of the second cap by a braze or weld.

16. The method according to claim 13, further comprising the step of forming the first and second caps by stamping.

17. The method according to claim 13, further comprising the step of fabricating the first and second caps from a liquid fuel resistant material.

18. The method according to claim 17, further comprising the step of fabricating the first and second caps from stainless steel.

* * * * *